(12) United States Patent
Levy et al.

(10) Patent No.: US 10,526,135 B1
(45) Date of Patent: Jan. 7, 2020

(54) MODULAR LIQUID STORAGE TANK

(71) Applicant: Acqualogic, Inc., Santa Cruz, CA (US)

(72) Inventors: Ross H Levy, Santa Francisco, CA (US); Robert Harasta, Carmel Valley, CA (US); Peter H Haase, Santa Cruz, CA (US)

(73) Assignee: Acqualogic, Inc., Santa Cruz, CA (US)

( * ) Notice: Subject to any disclaimer, the term of this patent is extended or adjusted under 35 U.S.C. 154(b) by 0 days.

(21) Appl. No.: 16/014,299

(22) Filed: Jun. 21, 2018

(51) Int. Cl.
- *B65D 90/08* (2006.01)
- *B65D 88/02* (2006.01)
- *B65D 90/02* (2019.01)

(52) U.S. Cl.
CPC ........... *B65D 90/08* (2013.01); *B65D 88/022* (2013.01); *B65D 90/023* (2013.01); *C02F 2201/007* (2013.01)

(58) Field of Classification Search
CPC ... B65D 7/30; B65D 7/32; B65D 7/12; B65D 90/08; B65D 90/026; B65D 90/023; B65D 90/02; B65D 21/0209; B65D 88/027; B65D 88/022; B65D 88/02; B65D 9/24; B65D 9/22; B65D 15/24
USPC .......... 220/4.17, 4.16, 4.12, 4.27, 4.26, 692, 220/693, 691, 682, 677
See application file for complete search history.

(56) References Cited

U.S. PATENT DOCUMENTS

| | | | | |
|---|---|---|---|---|
| 1,033,913 A | * | 7/1912 | Lloyd et al. ........... | B65D 90/08 220/4.17 |
| 2,378,295 A | * | 6/1945 | Flath ................... | E02D 29/0216 405/273 |
| 3,064,770 A | * | 11/1962 | Andrews .............. | B65D 90/024 52/630 |
| 3,327,883 A | * | 6/1967 | Buhler ................. | B65D 7/12 220/4.12 |
| 3,645,415 A | * | 2/1972 | Phelps ................. | B65D 88/02 220/565 |
| 4,002,261 A | * | 1/1977 | Litchfield ............. | F16B 12/02 220/683 |
| 4,193,510 A | * | 3/1980 | Weston ................ | B65D 90/025 220/4.13 |
| 7,531,087 B2 | * | 5/2009 | Brase ................... | C02F 3/006 210/143 |
| 7,874,443 B2 | * | 1/2011 | Schutz ................. | B65D 1/46 220/1.5 |
| 9,505,642 B2 | * | 11/2016 | Haase .................. | C02F 3/2846 |
| 2010/0170873 A1 | * | 7/2010 | Lopez .................. | B65D 9/12 217/12 R |
| 2016/0195118 A1 | * | 7/2016 | Munch-Fals .......... | F16B 2/245 24/535 |

FOREIGN PATENT DOCUMENTS

| | | | | |
|---|---|---|---|---|
| DE | 102010011072 A1 | * | 9/2011 | ............. B65D 9/24 |
| DE | 102013005867 A1 | * | 10/2014 | ............. B32B 27/06 |
| GB | 2103184 A | * | 2/1983 | ............. B65D 15/22 |
| WO | WO-2008104137 A1 | * | 9/2008 | ............. B65D 9/24 |

\* cited by examiner

*Primary Examiner* — Robert J Hicks
(74) *Attorney, Agent, or Firm* — Jonathan D Feuchtwang

(57) ABSTRACT

The present invention comprises a liquid storage tank which is adapted to hold a bladder which is to be filled with fluids, in particular, water, in conjunction with a water treatment facility. The liquid storage tank is uniquely constructed in a modular manner from basic predetermined structural components so as to be readily or quickly assembled and disassembled, in accordance with various embodiments as may be required or desired.

10 Claims, 9 Drawing Sheets

MODULAR LIQUID STORAGE TANK

FIELD OF THE INVENTION

The present invention relates generally to liquid storage tanks, more particularly to liquid storage tanks that are adapted to hold bladders which are to be filled with fluids, in particular, water, in conjunction with a water treatment facility, and even more particularly, to liquid storage tanks that are uniquely constructed in a modular manner from basic predetermined structural components so as to be readily or quickly assembled and disassembled in accordance with various embodiments, as required or desired, whereby construction costs can be minimized as well as the transportation costs of the basic disassembled modular components comprising the liquid storage tank which can then be readily and quickly assembled at a designated location or site.

BACKGROUND OF THE INVENTION

Various water treatment facilities are of course well known as exemplified by U.S. Pat. No. 9,505,642 which issued to Haase et al. on Nov. 29, 2016 and U.S. Pat. No. 7,531,087 which issued to Brase on May 12, 2009. As can readily be appreciated from such prior known systems, water treatment facilities normally comprise various different structures such as, for example, reactors, pumps, compressors, various different tanks, and the like. In connection with liquid storage tanks, for example, conventional liquid storage tanks are, unfortunately, not capable of being erected or assembled in a readily quick manner. Accordingly, the costs involved in assembling the liquid storage tanks are significantly high. In a similar manner, if such conventional liquid storage tanks need to be disassembled, in whole or in part, such as, for example, for maintenance, repair, or the like, the costs involved in such disassembly processes are likewise significantly high. In addition, if a particular liquid storage tank is to be relocated to a different site or water treatment facility, the transportation costs involved in transporting the fully assembled liquid storage tank are likewise significantly high.

Still further, if the treatment processes or treatment capacities, characteristic of a particular water treatment facility, changes with the passage of time, the overall structure of such conventional liquid storage tanks, or their structural configuration, or their size, cannot readily be altered in order to permit such liquid storage tanks to be utilized in conjunction with the new processing or capacity requirements of the water treatment facilities.

A need therefore exists in the art for a new and improved liquid storage tank. An additional need exists in the art for a new and improved liquid storage tank that is capable of being readily and quickly assembled and disassembled. A still additional need exists in the art for for a new and improved liquid storage tank that is constructed in a modular manner from a predetermined number and type of basic structural components such that the liquid storage tank is capable of being readily and quickly assembled and disassembled.

An additional need exists in the art for for a new and improved liquid storage tank that is constructed in a modular manner from a predetermined number and type of basic structural components such that the liquid storage tank is capable of being readily and quickly assembled and disassembled so as to significantly reduce assembly and disassembly costs.

An additional need exists in the art for for a new and improved liquid storage tank that is constructed in a modular manner from a predetermined number and type of basic structural components such that the liquid storage tank is capable of being readily and quickly assembled and disassembled so as to significantly reduce transportation costs when transporting the modular components to an installation site or when relocating the modular components to an alternative installation site.

An additional need exists in the art for a new and improved liquid storage tank that is constructed in a modular manner from a predetermined number and type of basic structural components such that the liquid storage tank is capable of being assembled so as to effectively have different geometrical configurations such as, for example, a cube, a rectangular parallelepiped, or that of any other polyhedron.

A further need exists in the art for a new and improved liquid storage tank that is constructed in a modular manner from a predetermined number and type of basic structural components such that the liquid storage tank is capable of being assembled so as to effectively comprise different sections which can effectively provide the liquid storage tank with different overall geometrical configurations such as, for example, that of a cube, a rectangular parallelepiped, or any other polyhedron.

A further need exists in the art for a new and improved liquid storage tank that is constructed in a modular manner from a predetermined number and type of basic structural components such that the liquid storage tank is capable of being assembled so as to effectively comprise different sections which can effectively provide the liquid storage tank with different treatment processing capabilities and capacities as may be required to desired.

Accordingly, it is an overall objective of the present invention to provide a new and improved liquid storage tank.

An additional overall objective of the present invention is to provide a new and improved liquid storage tank that is cap-able of being readily and quickly assembled and disassembled.

A still additional overall objective of the present invention is to provide a new and improved liquid storage tank that is constructed in a modular manner from a predetermined number and type of basic structural components such that the liquid storage tank is capable of being readily and quickly assembled and disassembled.

An additional objective of the present invention is to provide a new and improved liquid storage tank that is constructed in a modular manner from a predetermined number and type of basic structural components such that the liquid storage tank is capable of being readily and quickly assembled and disassembled so as to significantly reduce assembly and disassembly costs.

An additional overall objective of the present invention is to provide a new and improved liquid storage tank that is constructed in a modular manner from a predetermined number and type of basic structural components such that the liquid storage tank is capable of being readily and quickly assembled and disassembled so as to significantly reduce transportation costs when transporting the modular components to an installation site, or when relocating the modular components to an alternative installation site at which the liquid storage tank will be reassembled.

An additional overall objective of the pre-sent invention is to provided a new and improved liquid storage tank that is constructed in a modular manner from a predetermined number and type of basic structural components such that the liquid storage tank is capable of being assembled so as to effectively have different geometrical configurations such as, for ex-ample, a cube, a rectangular parallelepiped, or that of any other polyhedron.

An additional overall objective of the present invention is to provide a new and improved liquid storage tank that is constructed in a modular manner from a predetermined number and type of basic structural components such that the liquid storage tank is capable of being assembled so as to effectively comprise different sections which can effectively provide the liquid storage tank with different overall geometrical configurations such as, for example, that of a cube, a rectangular parallelepiped, or any other polyhedron.

An overall objective of the present invention is to provide a new and improved liquid storage tank that is constructed in a modular manner from a predetermined number and type of basic structural components such that the liquid storage tank is capable of being assembled so as to effectively comprise different sections which can effectively provide the liquid storage tank with different treatment processing capabilities and capacities as may be required to desired.

SUMMARY OF THE INVENTION

The foregoing and other objectives are achieved in accordance with the teachings and principles of the present invention through the provision of a new and improved liquid storage tank which is constructed in a modular manner from modular assemblies. The liquid storage tank comprises an internal bladder within which a liquid is to be contained and confined, and an external framework which is provided to maintain the bladder intact. The external framework comprises panel assemblies which comprise panel members effectively secured within rail members of a structural framework wherein each side of the liquid storage tank comprises at least one panel member disposed within the structural framework, and wherein the panel assemblies are then connected together by means of conventional fastener hardware.

The structural framework comprises a pair of oppositely disposed, horizontally spaced, vertically oriented side rail members each one of which is provided with a channel within which one of the two opposite vertically oriented side edge portions of the panel member will be disposed, and a pair of oppositely disposed, vertically spaced, horizontally oriented upper and lower rail members which are likewise respectively provided with channels within which the oppositely disposed horizontally oriented upper and lower edge portions of the panel member will be disposed. In this manner, each one of the four sides of each panel member are disposed within one of the four rail members comprising the structural framework, and each end of each side rail member is fixedly secured to the upper and lower rail members by means of suitable connector brackets, nuts and bolts, or by any other suitable means such as, for example, welding.

Accordingly, it can be appreciated further that when four similar panel assemblies are attached together, the liquid storage tank achieves a geometrical configuration which is effectively that of a cube, whereas, still further, if multiple panel assemblies are connected together in a particular manner to a multiple number of other panel assemblies, the overall liquid storage tank can achieve an L-shaped configuration.

Still further, different configurations, comprising different polyhedrons, are achievable as a result of structurally interconnecting together a multiplicity of additional panel assemblies and a multiplicity of additional rail members. Lastly, cross-bracing may be connected between the upper and lower rail members, as well as between the oppositely disposed side rail members so as to effectively further reinforce the structural framework of the liquid storage tank in order to securely retain the bladder therein which is filled with a particular liquid.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
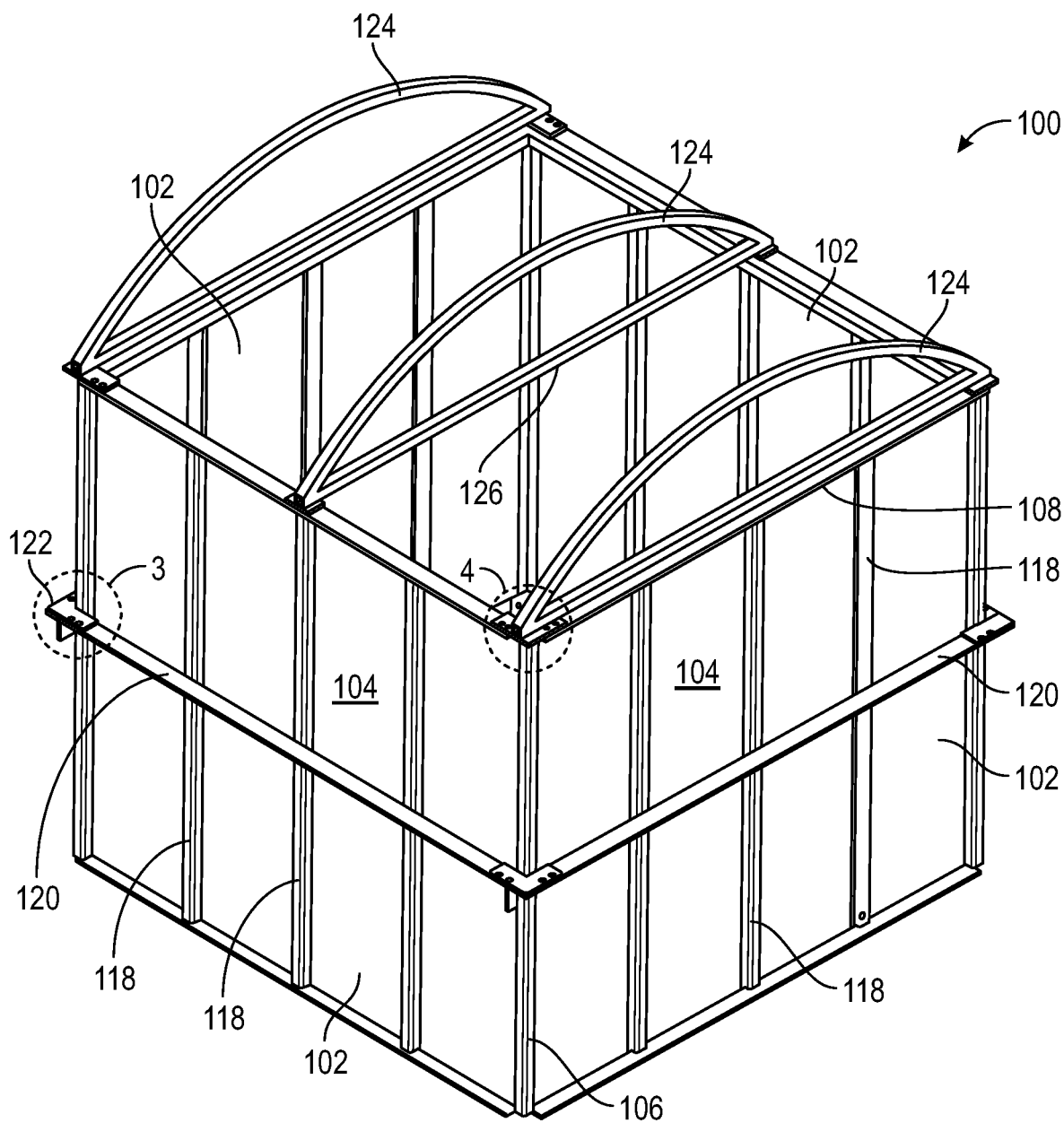
FIG. 1 is a perspective view of a first embodiment of a new and improved liquid storage tank that has been constructed or assembled in accordance with the principles and teachings of the present invention using basic modular structural components.
Figure 2:
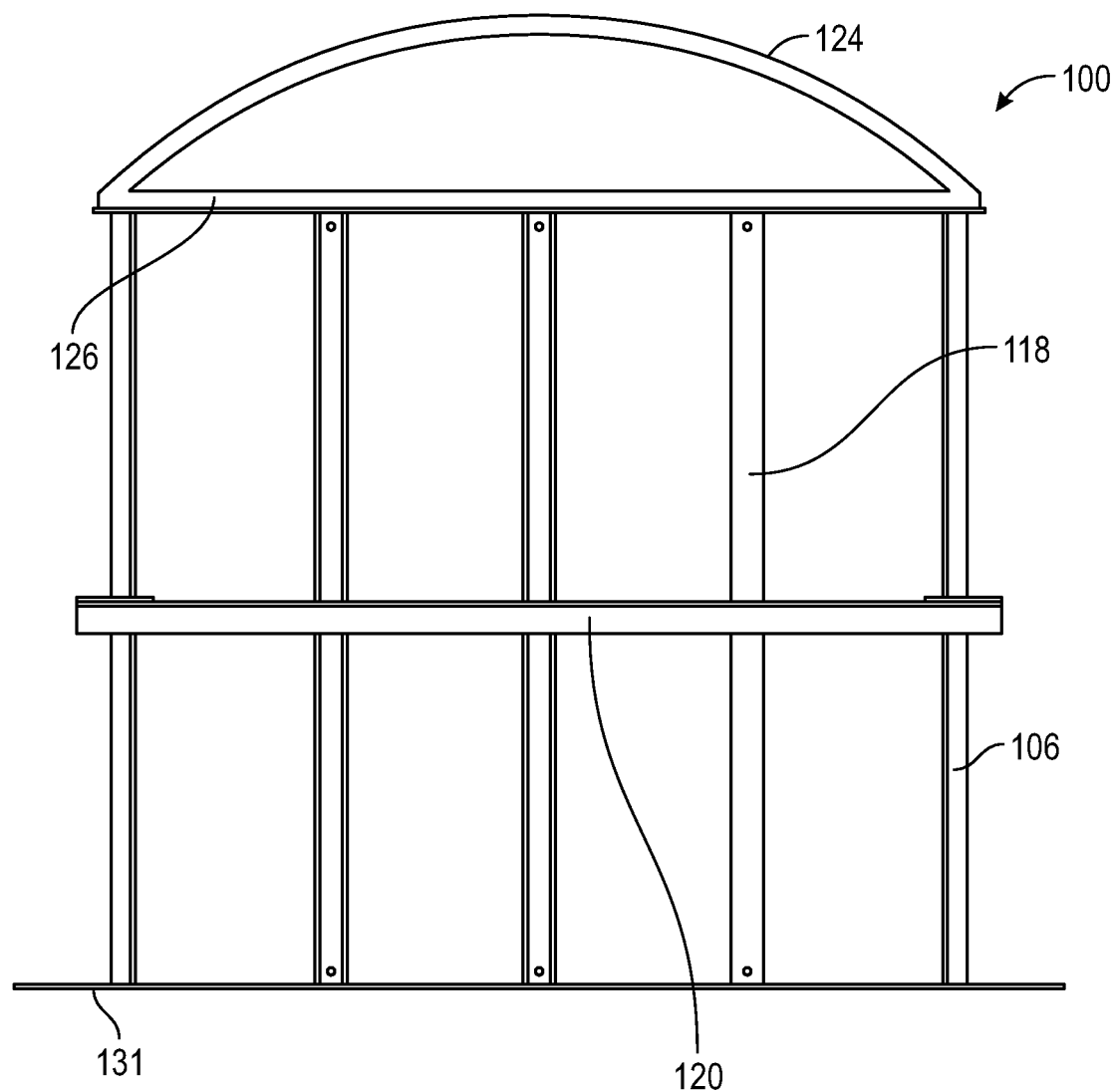
FIG. 2 is a front elevational view of the first embodiment liquid storage tank as illustrated within FIG. 1.
Figure 3:
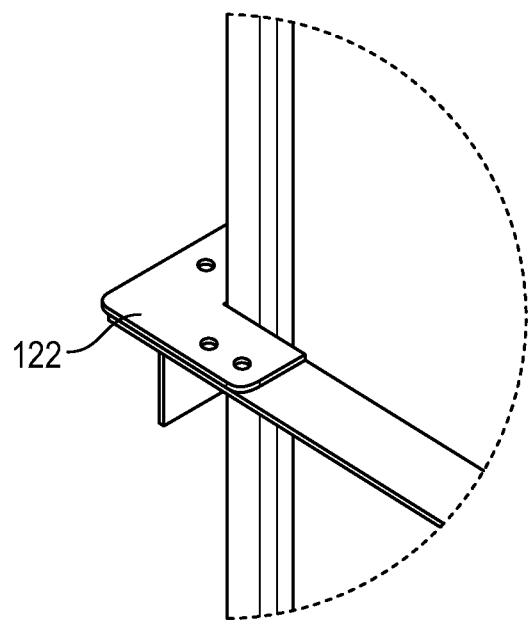
FIG. 3 is an enlarged detail view of the encircled region 3 denoted upon FIG. 1.
Figure 4:
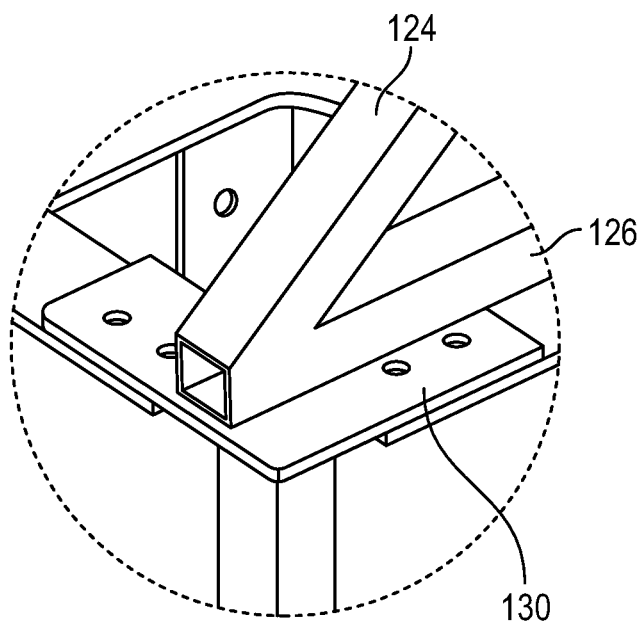
FIG. 4 is an enlarged detail view of the encircled region 4 denoted upon FIG. 1.
Figure 5:
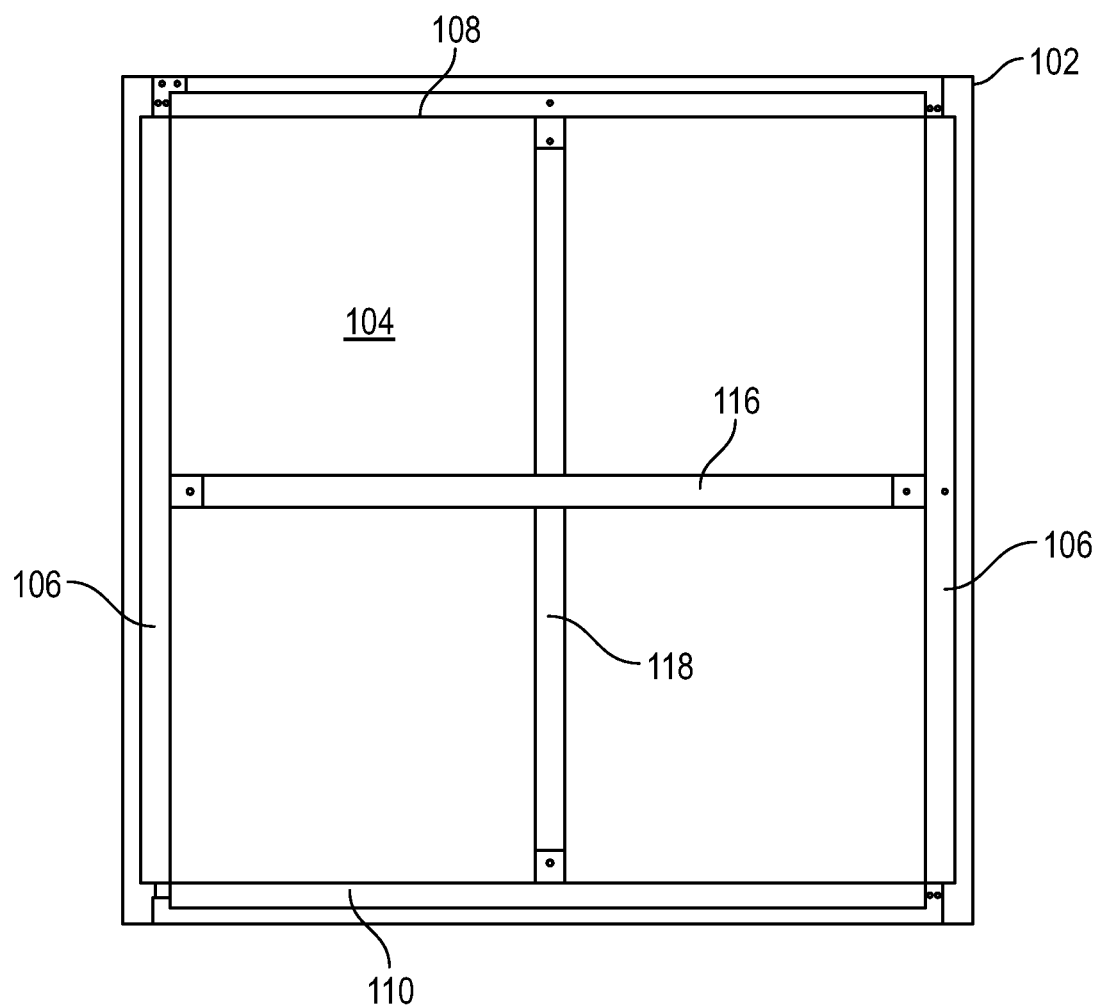
FIG. 5 is a front elevational view showing a basic modular panel assembly as constructed in accordance with the principles and teachings of the present invention, wherein a panel member has been enclosed and secured within a pair of oppositely disposed horizontally spaced vertically oriented side rail members and a pair of oppositely disposed vertically spaced horizontally oriented upper and lower rail members, and wherein, in addition, a pair of intersecting cross-braces have also been additionally provided for enhanced integrity of the basic modular panel assembly as may be desired or required.
Figure 6:
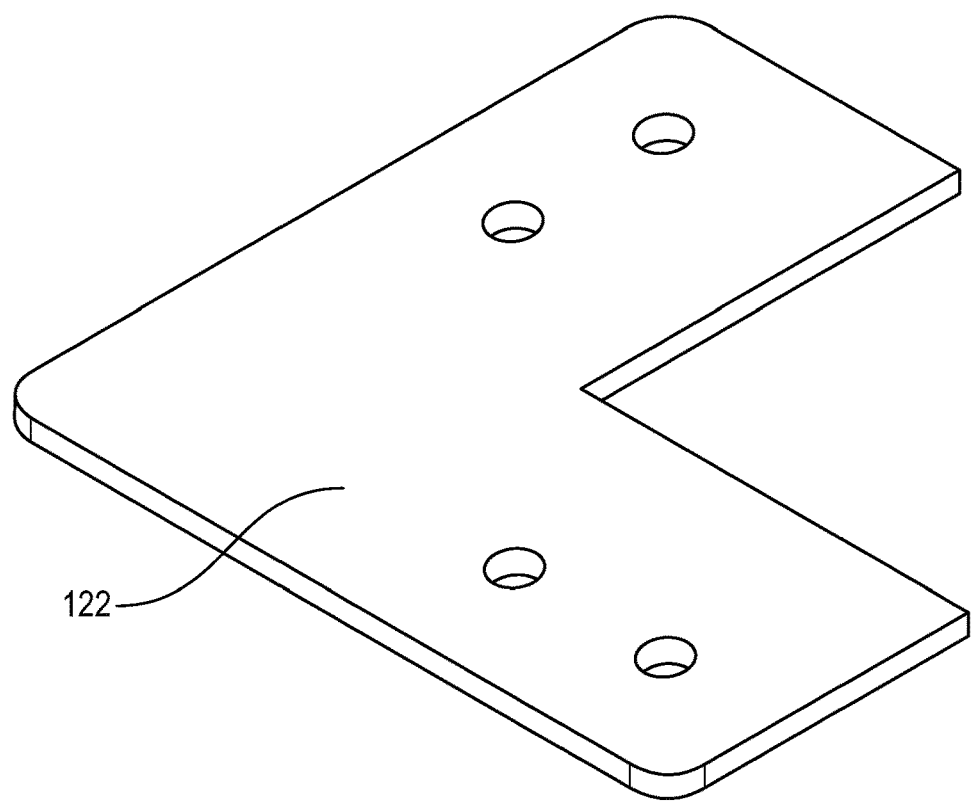
FIG. 6 is a perspective view of a conventional corner bracket, as is also illustrated within FIGS. 1 and 3, effectively extending around a corner of the liquid storage tank in order to connect two horizontally oriented cross-braces together.
Figure 7:
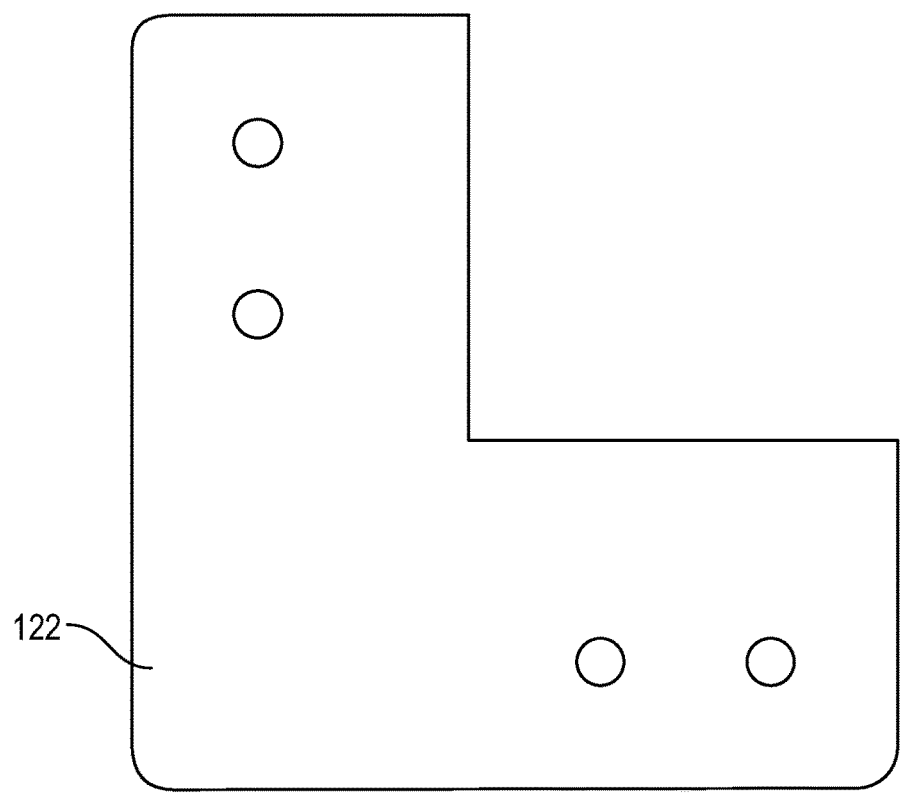
FIG. 7 is a top plan view of the conventional corner bracket as illustrated within FIG. 6.

With reference now being made to the drawings, and more particularly to FIGS. 1-9 thereof, a first embodiment of a liquid storage tank, constructed in accordance with the principles and teachings of the present invention, is disclosed and is generally indicated by the reference character 100. In accordance with this first embodiment of the liquid storage tank 100, it is seen that the liquid storage tank 100 effectively has the configuration of a cube as a result of being constructed from four panel assemblies 102 which are connected together along their vertically extending edge portions and which are angled with respect to each other at 90°. An example of a panel assembly 102 is more clearly illustrated within FIG. 5. More particularly, it is seen that each panel assembly 102 comprises a panel member 104, a pair of oppositely disposed, horizontally spaced, vertically extending corner tubular members 106, and a pair of oppositely disposed, vertically spaced, horizontally extending upper and lower channel members 108,110.

Figure 8:
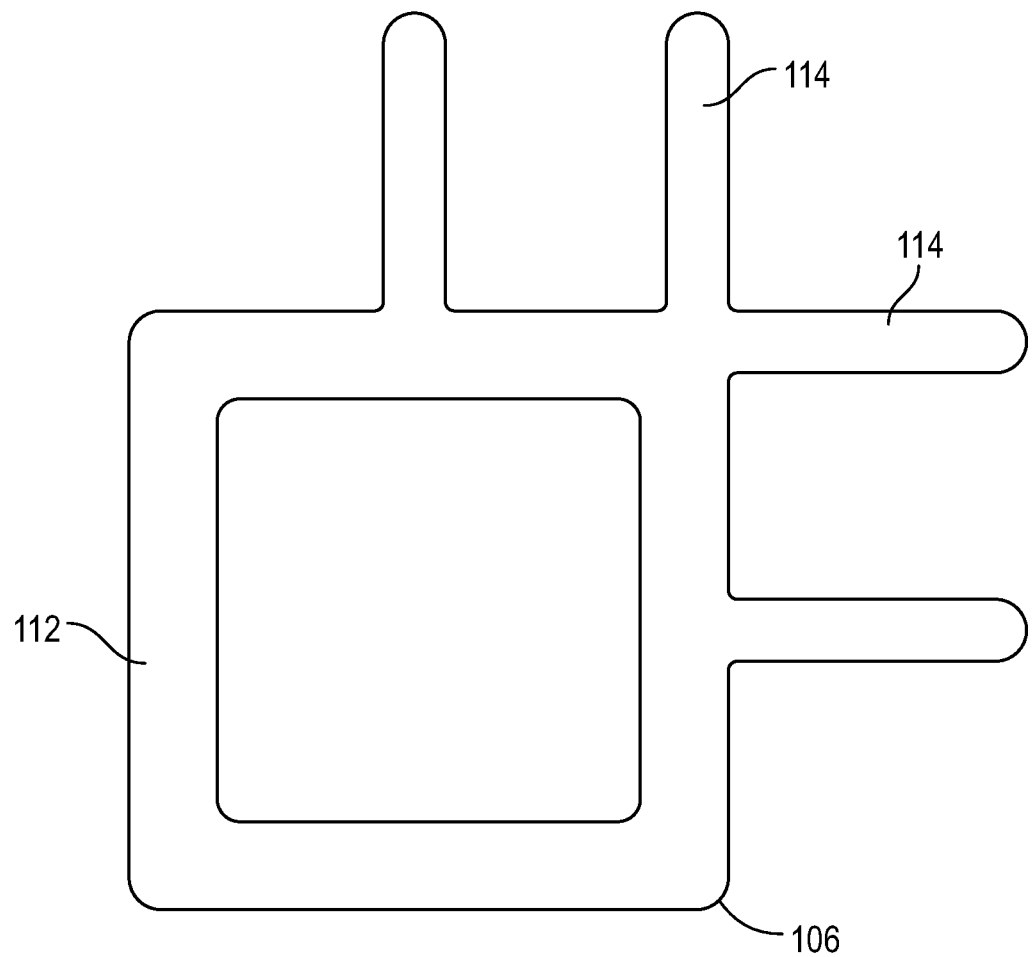
FIG. 8 is a horizontal cross-sectional view of a vertically upstanding corner tubular structural member which is provided with two orthogonally spaced rail members each one of which forms a three-sided channel whereby an edge portion of a panel member of a panel assembly of the liquid storage tank can be inserted into the fourth open side of the channel.

One of the vertically extending corner tubular members 106 is illustrated more clearly within FIG. 8 wherein it is seen the vertically extending corner tubular member 106 comprises a square-shaped primary tubular structural column 112, as viewed in cross-section, and a pair of channel members 114 which project outwardly from opposite sides of the primary tubular structural column 112, which form a corner region of the primary tubular structural column 112, such that the channel members 114 are oriented orthogonally with respect to each other. In this manner, each one of the channel members 114 effectively forms a three-sided channel or rail which is adapted to accommodate a vertically oriented side edge portion of one of the panel members 104, as disclosed within FIGS. 1 and 5, while the upper and lower horizontally oriented edge portions of each panel member 114 are accommodated within the horizontally extending upper and lower channel members 108,110.

Figure 9:
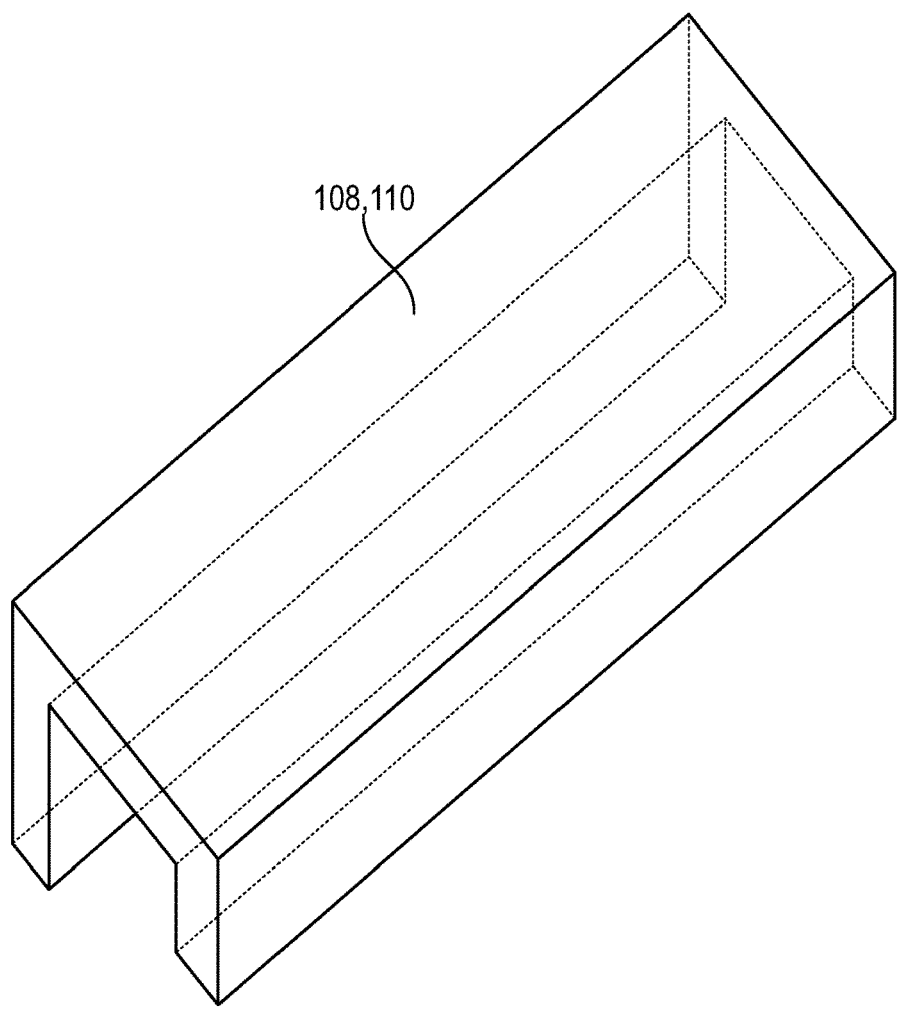
FIG. 9 is a perspective view of one of the upper or lower rail members utilized within the liquid storage tank structure and adapted to receive an upper or lower edge portion of one of the panel members comprising one of the modular panel assemblies.

One of the horizontally extending upper and lower channel members 108,110 is more clearly illustrated within FIG. 9, and it is seen that each one of the horizontally extending upper and lower channel members 108,110 is similar to each one of the channel members 114 in that each channel member 108,110 likewise forms a three-sided channel or rail which is adapted to accommodate the upper or lower edge portion of one of the liquid storage tank panel members 104.

It can therefore be readily appreciated that as a result of a plurality of basic modular components comprising, for example, a panel member 104, a pair of oppositely disposed, horizontally spaced, vertically extending corner tube members 106, and a pair of oppositely disposed, vertically spaced, horizontally extending upper and lower channel members 108, 110 being assembled together, a panel assembly 102 is able to be readily and quickly assembled. Still further, when a plurality of panel assemblies 102 are connected together, a liquid storage tank 100 may likewise be readily and quickly assembled.

It is to be noted that the means for connecting the pair of oppositely disposed, horizontally spaced, vertically extending corner tube members 106 and the pair of oppositely disposed, vertically spaced, horizontally extending upper and lower channel members 108,110 together may comprise various conventional connector structures or fasteners such as, for example, various brackets, nuts, bolts, and the like. In addition to the pair of oppositely disposed, horizontally spaced, vertically extending corner tube members 106 and the pair of oppositely disposed, vertically spaced, horizontally extending upper and lower channel members 108,110 being connected together at their corner regions by means of the aforenoted conventional bracket and fastener hardware, intermediate portions of the pair of oppositely disposed, horizontally spaced, vertically extending corner tube members 106 may be connected together by means of at least one horizontally extending cross-bracing structural member 116 which extend across the external surface portion of the panel member 104, while, in a similar manner, the pair of oppositely disposed, vertically spaced, horizontally extending upper and lower channel members 108,110 may likewise be connected together by means of at least one vertically extending cross-bracing structural member 118 which also extends across the external surface portion of the panel member 104, all as illustrated within FIG. 5.

Figure 10:
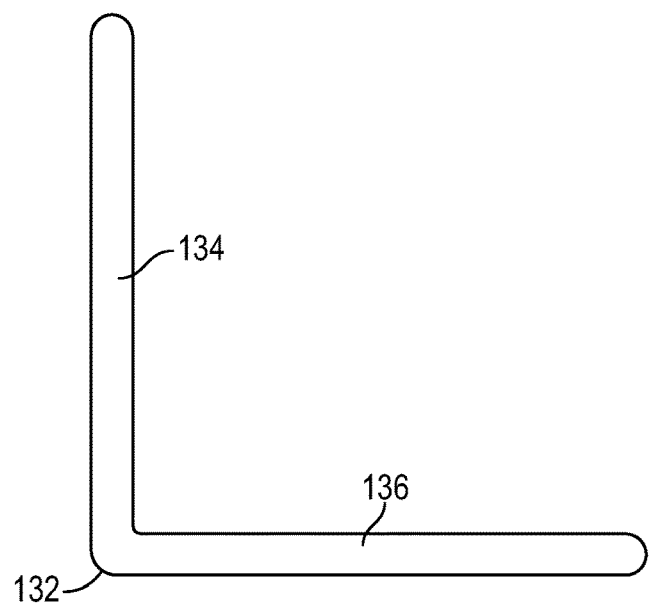
FIG. 10 is a cross-sectional view of an angle-iron or angle bracket connector which may be utilized to secure, for example, one of the tubular structural members, as shown in FIG. 8, to a foundation slab for the liquid storage tank.

The purpose of such cross-bracing structural members 116,118, as well as the various corner connections between the pair of oppositely disposed, horizontally spaced, vertically extending corner tube members 106 and the pair of oppositely disposed, vertically spaced, horizontally extending upper and lower channel members 108,110, is to effectively ensure the structural integrity of the liquid storage tank 100. The panel assemblies 102 and the panel members 104 comprising the liquid storage tank 100 are not intended to be airtight or watertight, but are simply provided as an integral structural assembly, comprising the liquid storage tank 100, so as to assuredly provide the necessary structural integrity in order to safely contain the bladder when the same is under load conditions as a result of the liquid being stored therewithin. Along these lines, it is noted, as illustrated within FIG. 1, that each panel assembly 102 is provided with multiple vertically extending cross-bracing structures 118. Still further, the liquid storage tank 100 may optionally be provided with a plurality of horizontally extending cross-bracing structural members 120 which extend along each side of the liquid storage tank 100 and effectively encircle or circumferentially surround the entire liquid storage tank 100. The horizontally extending cross-bracing structural members 120 may be connected at the corner regions of the liquid storage tank 100 by means of suitable corner brackets 122 which are more clearly illustrated within FIGS. 3, 6 and 7. It is further seen from FIGS. 1 and 2 that if a roof is desired to be attached to the liquid storage tank 100, arcuately-shaped roof beams 124, having horizontally extending lower connecting beams 126, may be fixedly secured to those upper channel members 108 which are disposed upon opposite ends of the liquid storage tank 100 by means of suitable connector brackets 130 which can be more clearly seen in FIG. 4. It is lastly noted that while the liquid storage tank 100 is not necessarily provided with a bottom panel or floor, the liquid storage tank 100 may be fixedly connected to, for example, a concrete slab, as shown at 131 in FIG. 2. In order to securely fix the liquid storage tank 100 to the concrete slab, suitable L-shaped angle brackets 132, as illustrated within FIG. 10, may be utilized whereby, for example, the vertically upstanding leg 134 of each one of the L-shaped angle brackets 132 is fixedly secured to one of the corner tube structural column 112 while the horizontally extending leg 136 of each one of the L-shaped angle brackets 132 is fixedly secured to the concrete slab 131.

Figure 11:
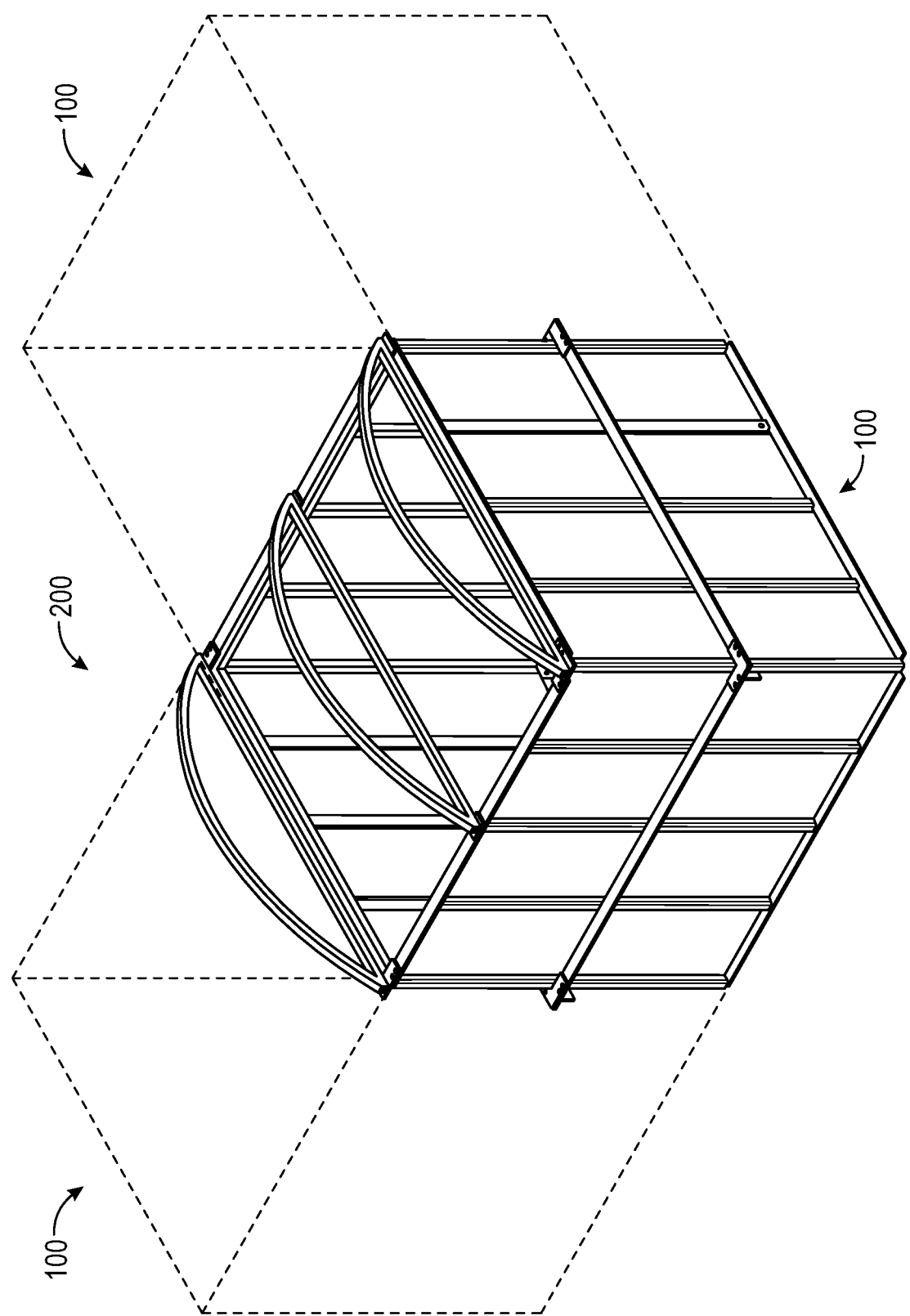
FIG. 11 is a perspective view, similar to that of FIG. 1, showing, however a second embodiment of a liquid storage tank, as constructed in accordance with the principles and teachings of the present invention, wherein the liquid storage tank is seen to have an L-shaped configuration.
Figure 12:
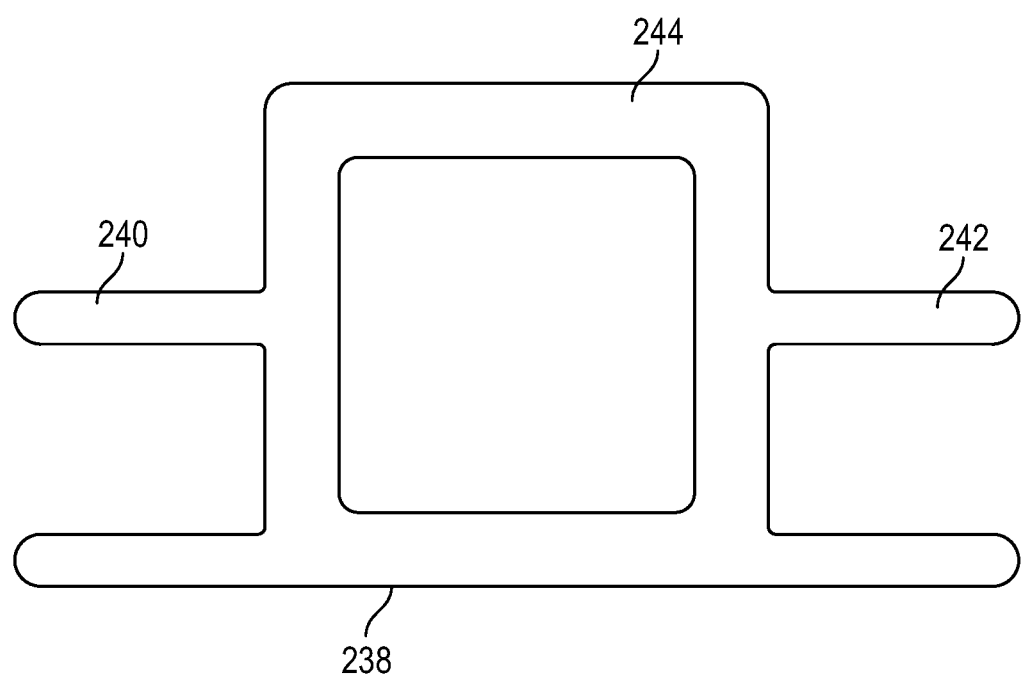
FIG. 12 is horizontal cross-sectional view of a vertically upstanding tubular structural member similar to that of FIG. 8, wherein, however, the two rail members are disposed upon opposite sides of the tubular structural member such that edge portions of successive, in-line panel members can be inserted into the open sides of the channels such that the overall length or width dimension of the liquid storage tank can be increased.

With reference lastly being made to FIGS. 11 and 12, while it has been previously noted that the construction of the liquid storage tank 100 can be readily and quickly assembled from the aforenoted limited number of modular structural components, and of course, in a reverse manner, the liquid storage tank 100 can be readily and quickly disassembled, it is to be further appreciated that as a result of such modular construction, liquid storage tanks can be constructed so as to have a multitude of desirable solid geometrical configurations other than that of a cube as illustrated within FIG. 1. Such other solid geometrical configurations may prove necessary so that a particular liquid storage tank, having a particular alternative solid geometrical configuration, can in fact be constructed so as to fulfill the needs or requirements at a particular installation or site. For example, as illustrated within FIG. 11, three liquid storage tanks 100 can effectively be connected together such that the overall solid geometrical configuration of a new liquid storage tank 200 can be achieved, wherein the liquid storage tank 200 has a substantially L-shaped configuration. In order to facilitate the construction of the new liquid storage tank 200, it will be appreciated that several of the original corner tubular members 106 will have to be replaced with an in-line tubular member 238 as illustrated within FIG. 12. The in-line tubular member 238 is similar to the corner tubular member 106 except that in lieu of the square-shaped primary tubular structural column 112 having the pair of channel members 114 projecting outwardly from opposite sides of the primary tubular structural column 112 which form a corner region of the primary tubular structural column 112 such that the channel members 114 are oriented orthogonally with respect to each other, a pair of channel members 240,242 project outwardly from opposite sides of the primary structural column 244 such that the pair of channel members 240,242 are effectively disposed in line with each other.

In this manner, the panel assemblies 102 of the connected liquid storage tanks 100 will be disposed in line with each other. It is to be noted that the various tubular members 106,238 and their integral channels 114, 240,242, as well as the upper and lower channel members 108,110 may be fabricated from extruded aluminum or extruded steel, while the panel members 104 may be fabricated from wood, metal, plastic, composite material, or the like, as long as such materials can withstand the pressurized loading exerted thereon by means of the bladder when the bladder is fully loaded with its liquid, and as long as such materials can withstand extended exposure to the elements. In turn, the bladder may be fabricated from any expansible, water-tight material which must also be capable of withstanding the pressurized loading exerted thereon when the bladder is fully loaded with a particular liquid.

Obviously, many variations and modifications of the present invention are possible in light of the above teachings. For example, while a first embodiment of a liquid storage tank having the shape of a geometrical cube has been illustrated, and while a second embodiment of a liquid storage tank having an L-shaped configuration has likewise been illustrated, other liquid storage tanks may have other configurations comprising other polyhedrons. It is therefore to be understood that within the scope of the appended claims, the present invention may be practiced otherwise than as specifically described herein.

What is claimed:

1. A liquid storage tank, comprising:
a plurality of panel assemblies connected together so as to effectively form an enclosed upstanding structure having a plurality of corners,
wherein each one of said plurality of panel assemblies is fabricated from a plurality of modular components comprising a panel member having oppositely disposed vertically extending side edge portions and oppositely disposed horizontally extending upper and lower edge portions, a pair of oppositely disposed vertically extending side channel members for accommodating said oppositely disposed vertically extending side edge portions of said panel member, and a pair of oppositely disposed horizontally extending upper and lower channel members for accommodating said oppositely disposed horizontally extending upper and lower edge portions of said panel member;
connector hardware fixedly connecting said pair of oppositely disposed horizontally extending upper and lower channel members to said pair of oppositely disposed vertically extending side channel members so as to fixedly retain said panel member within each panel assembly; and
wherein each corner of said liquid storage tank comprises a corner structural column having a pair of channels projecting outwardly from opposite sides so as to define side channel members for accommodating the side edge portions of the side panels that form two sides of said liquid storage tank which are oriented orthogonally with respect to each other.

2. The liquid storage tank as set forth in claim 1, wherein said liquid storage tank has a geometrical configuration which is substantially that of a cube.

3. The liquid storage tank as set forth in claim 2, further comprising cross-bracing which is connected to said pair of oppositely disposed vertically extending side channel members for accommodating said oppositely disposed vertically extending side edge portions of said panel member.

4. The liquid storage tank as set forth in claim 2, further comprising cross bracing which is connected to said pair of oppositely disposed horizontally extending upper and lower channel members for accommodating said oppositely disposed horizontally extending upper and lower edge portions of said panel member.

5. The liquid storage tank as set forth in claim 2, further comprising cross-bracing circumferentially surrounding said liquid storage tank and connected to each other at corner regions of said liquid storage tank by means of corner braces.

6. The liquid storage tank as set forth in claim 1, wherein said plurality of channel members are fabricated from a material selected from the group comprising extruded steel and extruded aluminum.

7. The liquid storage tank as set forth in claim 1, wherein said panel members are fabricated from a material selected from the group comprising (wood, plastic, metal, composite material).

8. The liquid storage tank as set forth in claim 1, wherein a plurality of liquid storage tanks may be fixedly connected together such that the overall configuration of the resulting liquid storage tank is that of a polyhedron.

9. The liquid storage tank as set forth in claim 8, wherein said plurality of liquid storage tanks that are connected together comprises at least three liquid storage tanks such that said overall configuration of the resulting liquid storage tank is that of an L.

10. A liquid storage tank adapted to be mounted on a concrete slab, comprising:

a plurality of panel assemblies connected together so as to effectively form an enclosed upstanding structure having a plurality of corners, wherein each one of said plurality of panel assemblies is fabricated from a plurality of modular components comprising a panel member having oppositely disposed vertically extending side edge portions and oppositely disposed horizontally extending upper and lower edge portions, a pair of oppositely disposed vertically extending side channel members for accommodating said oppositely disposed vertically extending side edge portions of said panel member, and a pair of oppositely disposed horizontally extending upper and lower channel members for accommodating said oppositely disposed horizontally extending upper and lower edge portions of said panel member;

connector hardware fixedly connecting said pair of oppositely disposed horizontally extending upper and lower channel members to said pair of oppositely disposed vertically extending side channel members so as to fixedly retain said panel member within each panel assembly;

wherein each corner of said liquid storage tank comprises a corner structural column having a pair of channels projecting outwardly from opposite sides so as to define side channel members for accommodating side edge portions of said side panels that form two sides of said liquid storage tank which are oriented orthogonally with respect to each other; and a plurality of L-shaped angle irons connecting said structural corner columns of said liquid storage tank to the concrete slab.

* * * * *